(12) United States Patent
Kim

(10) Patent No.: US 7,015,899 B2
(45) Date of Patent: Mar. 21, 2006

(54) METHOD FOR INPUTTING CHARACTERS IN PORTABLE DEVICE HAVING LIMITED DISPLAY SIZE AND NUMBER OF KEYS, AND PORTABLE DEVICE USING THE SAME

(75) Inventor: Sang-beom Kim, Seoul (KR)

(73) Assignee: Samsung Electronics. Co. Ltd., Kyungki-do (KR)

( * ) Notice: Subject to any disclaimer, the term of this patent is extended or adjusted under 35 U.S.C. 154(b) by 356 days.

(21) Appl. No.: 10/253,205

(22) Filed: Sep. 24, 2002

(65) Prior Publication Data

US 2003/0112223 A1      Jun. 19, 2003

(30) Foreign Application Priority Data

Dec. 19, 2001 (KR) ............................... 2001-81256

(51) Int. Cl.
*G09G 5/00* (2006.01)

(52) U.S. Cl. ..................... 345/169; 345/171; 345/172; 345/773

(58) Field of Classification Search ........ 345/156–179, 345/773; 178/18.01–18.07, 19.01–19.06
See application file for complete search history.

(56) References Cited

U.S. PATENT DOCUMENTS

| | | | |
|---|---|---|---|
| 5,812,117 A * | 9/1998 | Moon | 345/169 |
| 6,052,070 A | 4/2000 | Kivela et al. | 341/22 |
| 6,614,422 B1 * | 9/2003 | Rafii et al. | 345/168 |
| 2002/0041327 A1 * | 4/2002 | Hildreth et al. | 348/42 |
| 2002/0044134 A1 * | 4/2002 | Ericson et al. | 345/163 |
| 2002/0061217 A1 * | 5/2002 | Hillman et al. | 400/489 |
| 2003/0202832 A1 * | 10/2003 | Lorenzo | 400/103 |
| 2003/0210280 A1 * | 11/2003 | Baker et al. | 345/835 |
| 2004/0080541 A1 * | 4/2004 | Saiga et al. | 345/805 |

FOREIGN PATENT DOCUMENTS

EP      0 930 760 A2      7/1999

* cited by examiner

*Primary Examiner*—Vijay Shankar
(74) *Attorney, Agent, or Firm*—F. Chau & Associates, LLC

(57) ABSTRACT

A portable device includes a display unit, a memory, input keys, and a microprocessor. The display unit has a character window, which includes a selecting character window and a selected character window, for displaying characters. One character line including the character which has virtual coordinates indicated by a cursor is displayed in the selecting character window, and the character selected from the characters in the selecting character window is displayed in the selected character window by input keys. The memory stores the characters having intrinsic virtual coordinates, and several input keys serve for navigating across the characters by using the virtual coordinates of the characters to select the characters. The microprocessor controls the display of the characters on the display unit in correspondence to the input of the input keys.

22 Claims, 5 Drawing Sheets

PAGE1

| A | B | C | D | E | F |
|---|---|---|---|---|---|
| G | H | I | J | K | L |
| M | N | O | P | Q | R |
| S | T | U | V | W | X |
| Y | Z | 0 | 1 | 2 | 3 |
| 4 | 5 | 6 | 7 | 8 | 9 |

PAGE2

| a | b | c | d | e | f |
|---|---|---|---|---|---|
| g | h | i | j | k | l |
| m | n | o | p | q | r |
| s | t | u | v | w | x |
| y | z | | | | |

PAGE3

| ㄱ | ㄴ | ㄷ | ㄹ | ㅁ | ㅂ |
|---|---|---|---|---|---|
| ㅅ | ㅇ | ㅈ | ㅊ | ㅋ | ㅌ |
| ㅍ | ㅎ | ㄲ | ㄸ | ㅆ | ㅃ |
| ㅉ | | | | | |

PAGE4

| ㅏ | ㅑ | ㅓ | ㅕ | ㅗ | ㅛ |
|---|---|---|---|---|---|
| ㅜ | ㅠ | ㅡ | ㅣ | ㅐ | ㅒ |
| ㅔ | ㅖ | | | | |

PAGE5

| ! | @ | # | $ | % | < |
|---|---|---|---|---|---|
| & | * | ( | ) | - | = |
| + | - | ) | ( | > | / |
| ? | | | | | |

METHOD FOR INPUTTING CHARACTERS IN PORTABLE DEVICE HAVING LIMITED DISPLAY SIZE AND NUMBER OF KEYS, AND PORTABLE DEVICE USING THE SAME

BACKGROUND OF THE INVENTION

1. Field of the Invention

The present invention relates to a portable device having display means such as a liquid crystal display (LCD), and more particularly, to a portable device having limited display size and number of input keys.

2. Description of the Related Art

As the size of portable devices such as mobile telephones or compact disk players (CD players) has been reduced, the number of input keys and the display size of these devices has decreased. However, the memory capacity of the portable devices has increased and the functionality of the portable device has improved.

An example of a portable device having a limited display size and number of input keys is a compact disk (CD) player or an MPEG audio layer 3 (MP3) player that stores and reproduces audio files. The CD player reproduces the files stored in a CD, which is a kind of optical disk, and the MP3 player reproduces the MP3 music file, which is a kind of high quality audio compressing technology.

A CD-ROM used in the CD/MP3 combination player can store about 640 Mbytes of MP3 files. When the size of one MP3 type song is assumed to be 4 Mbytes, about 150 songs can be stored in one CD-ROM. Moreover, according to development in the compressing technology of the music file, if the size of one MP3 type song is further reduced to one third of the assumed 4 Mbytes, about 400 songs can be stored in one CD-ROM.

When several hundreds of songs are stored in one CD-ROM, it can be difficult to select songs by using only forward and backward keys. To solve this problem, the function of selecting ten songs by using one key has been introduced; however, considerable effort and time can still be needed for selecting one song.

An excessive increase in the limited number of input keys is prohibited by the small size of the portable devices. Therefore, a need exists for an efficient means of searching and selecting a song by inputting the title of the song in the portable device is needed.

SUMMARY OF THE INVENTION

To solve the above-described problems, it is a first objective of the present invention to provide a portable device for inputting characters fast and easily in the portable device having limited display size and number of input keys.

It is a second objective of the present invention to provide a portable device for easily changing and/or adding characters embedded in the portable device in a software method without changing the hardware of the portable device.

It is a third objective of the present invention to provide a method for inputting characters fast and easily in a portable device having limited display size and number of input keys.

The portable device according to the present invention comprises a display unit including a character window for displaying characters, a memory for storing the characters, which have intrinsic virtual coordinates and a plurality of input keys for navigating and selecting the characters by using the virtual coordinates of the characters. The portable device further comprises a microprocessor for displaying the characters on the display unit in correspondence to the input of the input keys. The character window comprises a selecting character window for displaying one character line, which includes the character having the virtual coordinates indicated by a cursor and a selected character window for displaying the character, which is selected from the characters displayed on the selecting character window, by using the input keys.

It is preferable that the virtual coordinates include a X-coordinate and a Y-coordinate, and the characters are arranged along an X-axis and a Y-axis for corresponding to the virtual coordinates. The number of characters included in the character line is arranged along the X-axis.

The input keys include a LEFT key, a RIGHT key, an UP key, a DOWN key, and an ENTER key.

The Y-coordinate of the virtual coordinates, which is indicated by the cursor in the selecting character window, is increased by the input of the UP key and decreased by the input of the DOWN key. The X-coordinate of the virtual coordinates, which is indicated by the cursor in the selecting character window, is increased by the input of the RIGHT key and decreased by the input of the LEFT key. The character, which is indicated by the cursor in the selecting window, is selected by the input of the ENTER key for being displayed on the selected character window.

According to an embodiment of the present invention, a method for navigating and inputting characters in a portable device having a displaying unit comprising a selecting character window and a selected character window; a memory for storing the characters which have intrinsic virtual coordinates; and a plurality of input keys. The method for inputting the characters in the portable device according to the present invention comprises selecting the selecting character window, changing virtual coordinates which are indicated by a cursor by using the input keys, thereby navigating the characters and displaying one character line including the character of the virtual coordinates, which are indicated by the cursor, on the selecting character window. The method further comprises selecting one character from the characters displayed on the selecting character window by using the input keys and displaying the selected character on the selected character window.

The virtual coordinates include an X-coordinate and a Y-coordinate, and the characters are arranged along an X-axis and a Y-axis for corresponding to the virtual coordinates. Here, the characters included in the character line are arranged along the X-axis.

The input keys include a LEFT key, a RIGHT key, an UP key, a DOWN key, and an ENTER key.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF PREFERRED EMBODIMENTS

Figure 1:
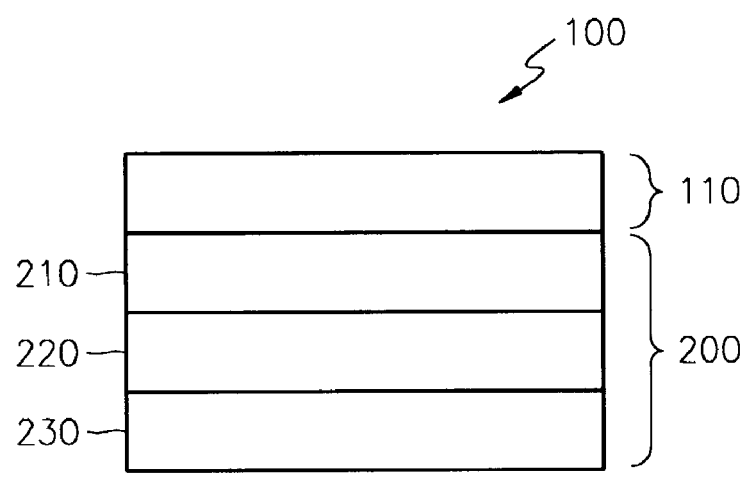
FIG. 1 schematically illustrates a display screen of a portable device according to an embodiment of the present invention.

The objectives of the present invention will be clearly defined with reference to the accompanying drawings, in which the same reference numerals in different drawings represent the same elements.

By applying virtual coordinates to characters, which are embedded in the memory of a portable device, the number of characters is not limited by a display size and the number of input keys. In a conventional portable device, more than one character can be allotted to each input key.

According to the present invention, the characters with intrinsic virtual coordinates are arranged in a virtual space, and a user changes the virtual coordinates, which are indicated by a cursor, by using the input keys for displaying a character unit corresponding to the virtual coordinates. Accordingly, a small number of keys can be used efficiently.

FIG. 1 schematically illustrates a display screen of a portable device according to an embodiment of the present invention. Referring to FIG. 1, the display screen 100 is separated into an icon window 110 and a character window 200, which can be located under the icon window 110.

In the icon window 110, several symbols can be displayed to display the operation and state of the portable device according to manufacturer settings of the portable device and/or according to a user preference.

The character window 200 can be formed of three lines 210, 220, and 230 for displaying 12 characters on each line. The characters can include letters such as English and Korean characters, numbers, special characters, and symbols.

Figure 2:
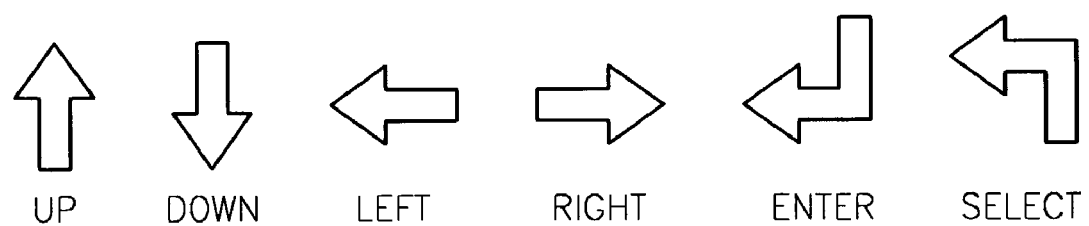
FIG. 2 schematically illustrates input keys of the portable device according to the embodiment of the present invention.

FIG. 2 schematically illustrates input keys of the portable device according to the embodiment of the present invention. Referring to FIG. 2, keys, such as UP, DOWN, LEFT, RIGHT, ENTER, and SELECT can be arranged in the portable device according to the embodiment of the present invention.

Figure 3:
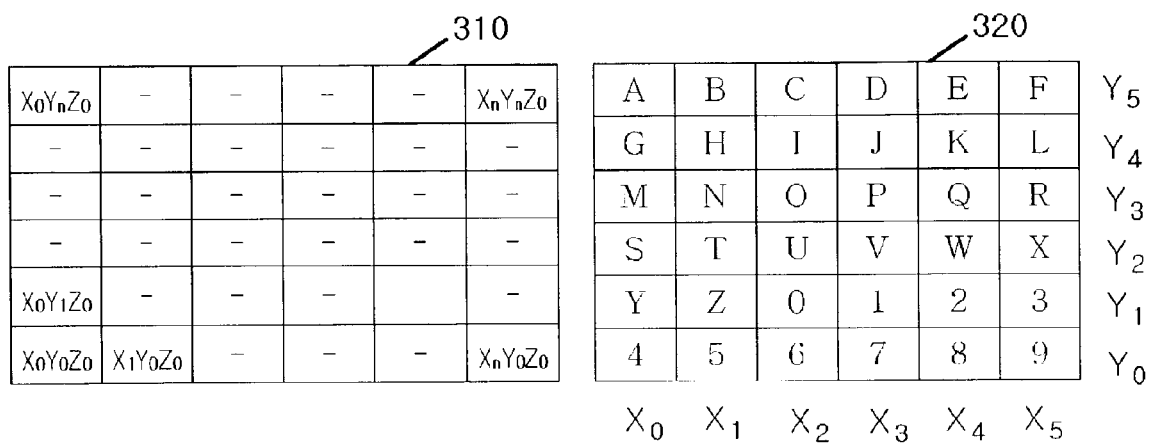
FIG. 3 shows tables of an example of characters embedded in the portable device and an example of virtual coordinates corresponding to the characters according to the embodiment of the present invention.

FIG. 3 shows tables illustrating an example of the characters embedded in the portable device according to the embodiment of the present invention, and coordinates corresponding to the characters, respectively. Referring to FIG. 3, the left table 310 illustrates a virtual space having virtual coordinates. For example, the virtual coordinates can have three coordinates such as X, Y, and Z. In FIG. 3, the Z-coordinate is zero, and the X- and Y-coordinates have a coordinate value from 0 to n, where n is a positive integer.

Therefore, the virtual space shown in FIG. 3 forms a plane having n+1 values on an X- and Y-axes. The unit for one coordinate on the X-, Y-, and Z-axes in the virtual space is called as a cell. Intrinsic virtual X-, Y-, and Z-coordinates can be allotted for each cell, and one character corresponding to the virtual coordinates can be stored in each cell.

Referring to the virtual coordinates table 310, bottommost cells have coordinates of $X_0Y_0Z_0, X_1Y_0Z_0, \ldots, X_nY_0Z_0$ from left to right. Topmost cells have coordinates of $X_0Y_nZ_0, X_1Y_nZ_0, \ldots, X_nY_nZ_0$ from left to right.

An example of the characters corresponding to each virtual coordinate, which is displayed in the virtual coordinates table 310, can be displayed in a character table 320. In FIG. 3, n is equal to 5. Accordingly, six characters are arranged on the X-axis and the Y-axis for corresponding to each virtual coordinates.

Referring to the character table 320, the character corresponding to the virtual coordinates $X_0Y_0Z_0$ is 4, and the character corresponding to the virtual coordinates $X_nY_0Z_0$ is 9. The characters corresponding to the topmost coordinates $X_0Y_nZ_0, X_1Y_n, \ldots, X_nY_nZ_0$ are, from left to right, A, B, C, D, E, and F. The intrinsic characters can be allotted to each virtual coordinate. The characters embedded in the portable device can be arranged in the virtual space having intrinsic virtual coordinates.

The virtual coordinates are different from the address of the memory, which actually stores the characters. Therefore, the coordinates shown in FIG. 3 are the virtual coordinates, which do not represent the actual address in the memory of the portable device or point to the actual location on the display screen.

A user can navigate across the characters by using the virtual coordinates of the characters to select the characters. The navigation and selection of the characters are described by FIG. 4.

Figure 4:
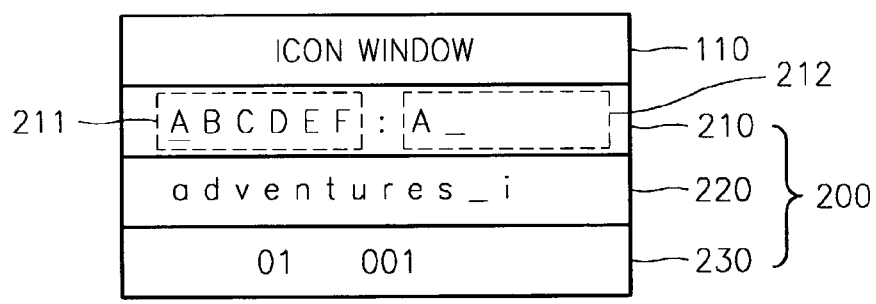
FIG. 4 illustrates an example of the display screen for describing a method for inputting the characters in the portable device according to the embodiment of the present invention.

FIG. 4 illustrates an example of the display screen to describe a method for inputting the characters in the portable device according to the embodiment of the present invention.

Referring to FIG. 4, the first line 210 of the character window 200 can be divided into two regions. The left half of the first line 210 is a selecting character window 211, and the right half of the first line 210 is a selected character window 212. To display 12 characters on each line 210, 220, and 230, six characters are displayed on the selecting and selected character windows 211 and 212, respectively.

The characters, which can be selected by the user, are displayed on the selecting character window 211 by character line unit. Here, one character line is formed of a predetermined number of characters. The number of characters included in one character line can be the same as the size of the selecting character window, namely the number of characters possibly displayed on the selecting character window. Therefore, in the embodiments of the present invention, the characters are displayed by six in the selecting window 211.

To display the characters on the selecting character window 211 by six, six characters are arranged on the X-axis in the virtual space. In other words, the X-coordinate is formed of six values, for example 0, 1, 2, 3, 4, and 5.

FIG. 3 shows an example of the character table 320 in which six characters are arranged on the X-axis.

To search and input a selected character, the cursor can be moved by using the input keys on the selecting character window 211 for searching the desired character. The cursor indicates the virtual coordinates in the selecting character window 211. In the selecting character window 211, the virtual coordinates, which are indicated by the cursor, are changed by the input of the UP, DOWN, LEFT, and RIGHT keys. Accordingly, the location of the cursor is also changed.

In the initial state of the selecting character window 211, the cursor is located on a leftmost character. The leftmost location can be the default location of the cursor. The characters A, B, C, D, E, and F, which are displayed on the selecting character window 211 shown in FIG. 4, make a default character line of the selecting character window 211.

If the characters embedded in the portable device are composed of the virtual coordinates table 310 and the character table 320 shown in FIG. 3, the virtual coordinates, which are initially indicated by the cursor in the selecting character 211, is $X_0Y_nZ_0$.

The user can move the cursor by using the UP, DOWN, LEFT, and RIGHT keys. The virtual coordinate values change according to the movement of the cursor. Accordingly, a character line including the character corresponding to the corresponding coordinate value is displayed on the selecting character window 211. The characters within one character line have identified Y- and Z-coordinates. The Y- and Z-coordinates of the characters within one character line are the same, while the X-coordinates of the characters within one character line are different.

By one input of the LEFT or RIGHT key, the coordinate values on the X-axis can be changed by one unit. By one input of the RIGHT key, the coordinate value on the X-axis can be increased by one unit while moving the cursor right within the selecting character window 211. By one input of the LEFT key, the coordinate value on the X-axis can be decreased by one unit while moving the cursor left within the selecting character window 211. The cursor is located on the character corresponding to the changed coordinate values. However, the Y-coordinate is not changed, thereby not changing the character line.

By one input of the UP or DOWN key, the Y-coordinate value can be changed by one unit. By one input of the DOWN key, the Y-coordinate value can be decreased by one unit. Accordingly, the character line including the character corresponding to the changed coordinate values can be displayed on the selecting character window 211. Therefore, the changed character line is the character line located under the prior character line. The location of the cursor is not changed within the selecting character line 211; however, the character line is changed for changing the virtual coordinates indicated by the cursor, thereby changing the character that is indicated by the cursor.

By one input of the UP key, the Y-coordinate can be increased by one unit. Accordingly, the character line including the character corresponding to the changed coordinate values can be displayed on the selecting character window 211. Therefore, the changed character line is the character line located over the prior character line. The location of the cursor is not changed within the selecting character window 211; however, the character line is changed, thereby changing the character that is indicated by the cursor.

After the user finds the selected character by using the cursor, the user can select the character by using the ENTER key. The selected character can be displayed at the left side of the selected character window 212.

As described above, the selecting character window 211 can be selected prior to moving the cursor and searching the character in the selecting character window 211. To move the cursor between the selecting character window 211 and the selected character window 212 in the character window 200, or among the selecting character window 211, the selected character window 212, and the second line 220 in the character window 200, the SELECT key can be used. For example, where the SELECT key is input with the UP or DOWN key in the selected state of the selecting character window 211, the selected character window 212 is selected. Then, the cursor is located in the selected character window 212, so that the user moves the cursor by using the LEFT or RIGHT key, such as in the selecting character window 211 for deleting or re-inputting the selected characters.

A microprocessor can be embedded in the portable device for controlling the display of the character line on the selecting character window 211 corresponding to the key input from the user, and for controlling the display of the selected character on the selected character window 212.

Referring to FIG. 4, six characters, A, B, C, D, E, and F are displayed on the selecting character window 211. The characters make a default character line that is initially displayed on the selecting character window 211. The character A can be selected in the selected character window 212.

On the second line 220, the title of a file starting with a word, for example, adventures, which starts with the character A, can be displayed. Where several title files starting with the character A are found, the information such as the number of found files or the order of the displayed file in the found files can be displayed on the second line 220.

On the third line 230, the numerals are displayed for setting the directory and the track of the found file displayed on the second line 220. FIG. 4 illustrates that the file titled adventures is located in a first track 001 of a first directory 01.

Figure 5:
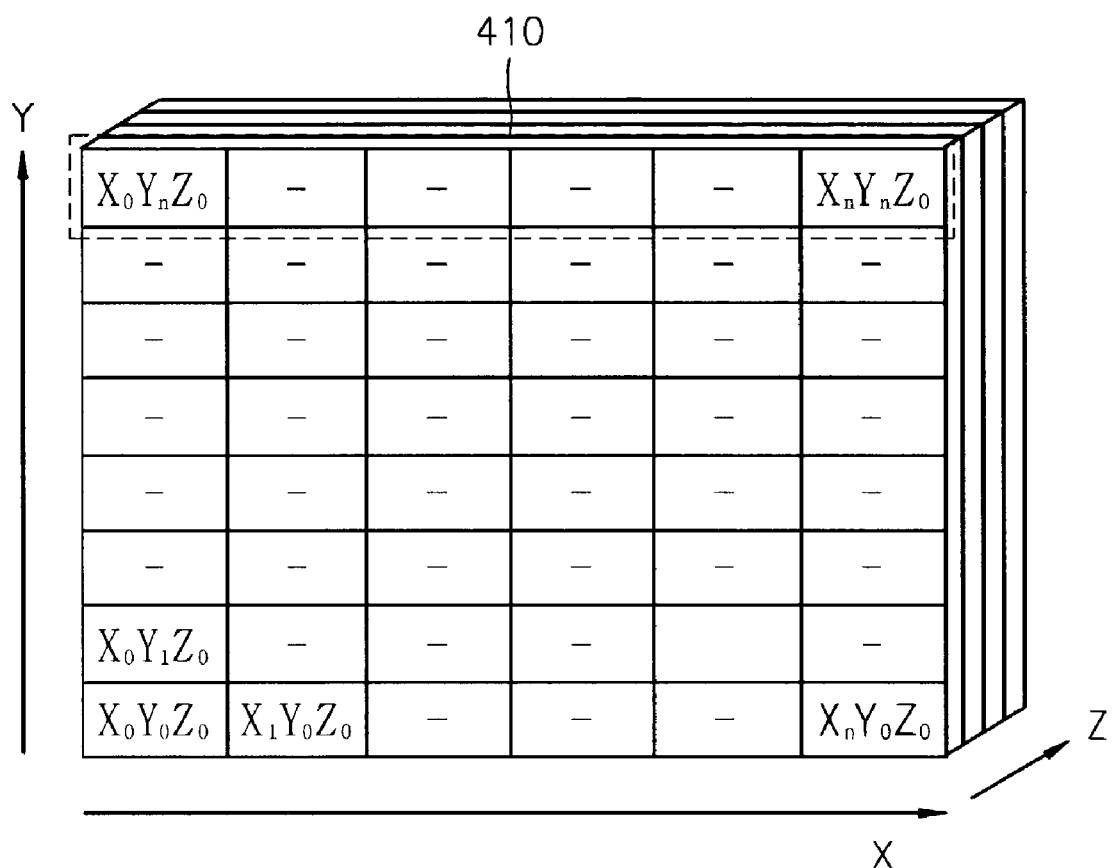
FIG. 5 is a table showing another example of virtual coordinates corresponding to the characters embedded in the portable device according to the embodiment of the present invention.

FIG. 5 is a table showing another example of virtual coordinates corresponding to the characters that are embedded in the portable device according to the embodiment of the present invention. FIG. 3 illustrates the coordinates of cells arranged on one Z-coordinate $Z_0$, and the characters corresponding to the coordinates of the cells. In FIG. 5, the cells, which are composed of cells as shown in FIG. 3, are arranged on a Z-axis. The unit for the characters displayed on the selecting character window 211 in FIG. 4 is the character line having same Y-coordinate and Z-coordinate. One character line 410 is displayed by a dotted-line box in FIG. 5.

Figure 6:
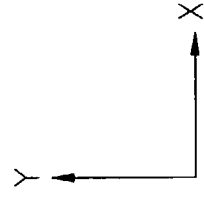
FIG. 6 is tables showing the arrangement of the characters on each page in the portable device according to the embodiment of the present invention.

When the characters are arranged in a virtual space formed of X-, Y-, and Z-axes, the characters corresponding to one Z-coordinate can be separated into one page by using a page concept. FIG. 6 illustrates an example of the characters embedded in the portable device, which are arranged on each page.

Referring to FIG. 6, the characters, which are embedded in the memory of the portable device, are arranged on five pages for the selection of a user.

Six characters are arranged on the X-axis and the Y-axis in the virtual page space. Therefore, each character has one coordinate value from six coordinate values on the X-axis, one from six coordinate values on the Y-axis, and one from five coordinate values on the Z-axis. Each page has different Z-coordinate values, and the X-coordinate increases from left to right direction on the X-axis, and the Y-coordinate increases from lower to upper direction on the Y-axis.

In the portable device having the characters composed as shown in FIG. 6, the user changes the Y-coordinate by using the UP and DOWN keys. By the change in the Y-coordinates, the character line displayed on the selecting character window 211 in FIG. 4 can be changed. As described above, six characters having identified Y- and Z-coordinates, namely the character line unit, can be displayed on the selecting character window 211. The number of characters included in one character line can be, for example, six, corresponding to the size of the selecting character window 211. However, the size of the character line is not limited by the size of the selecting character window 211.

The user changes the X-coordinate by using the LEFT and RIGHT keys. The cursor moves according to the change in the X-coordinates. Where the ENTER key is input when the cursor is located on the selected character, the corresponding character is selected for display on the selected character window 212 in FIG. 4.

When the page concept is used as shown in FIG. 6, it is preferable that the characters are selected by page unit. The Z-coordinate indicated by the cursor can be increased or decreased by the input of a predetermined key. The operation can be performed by the combination two or more input keys. For example, by the input of the UP and RIGHT keys simultaneously, the Z-coordinate can be increased by one, and by the input of the DOWN and LEFT keys simultaneously, the Z-coordinate can be decreased by one.

When the characters are composed of a plurality of pages as shown in FIG. 6, and the cursor indicates the virtual coordinates of a first or last character line within one page, he character line of the prior or next page can be displayed in correspondence to the input of the UP or DOWN key.

The pages shown in FIG. 6 can be arranged on the identified Z-coordinate. Here, the characters can be arranged on the X- and Y-axes on the identified Z-coordinate, and the pages can be separated on the Y-axis. In FIG. 6, one page is formed by the six Y-coordinate values, namely, six character lines.

Where the cursor indicates the first or last character line on one page, the character line of the prior or next page is displayed in correspondence to the input of the UP or DOWN key.

Figure 7:
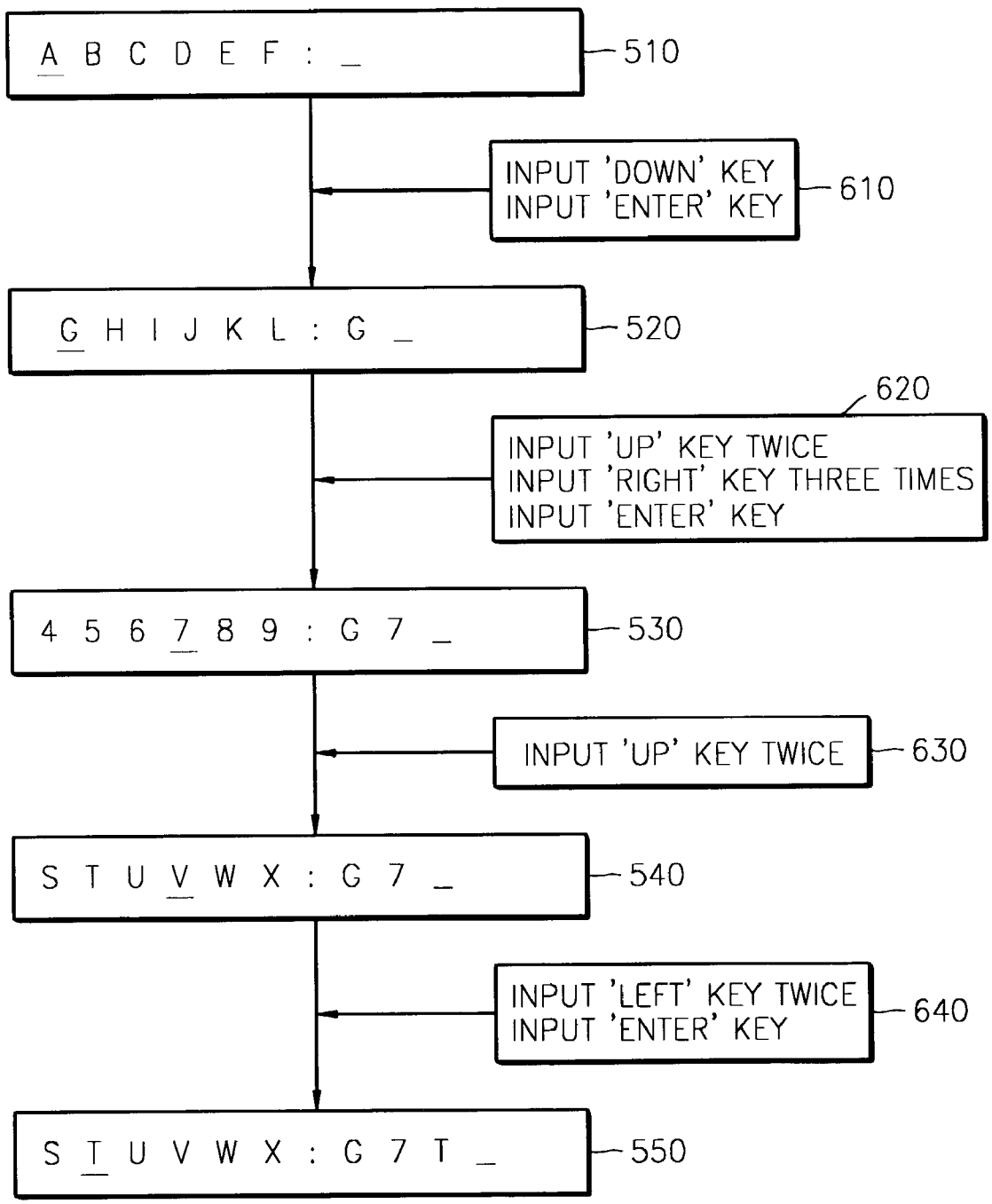
FIG. 7 illustrates an example of a method for inputting characters in the portable device according to the embodiment of the present invention.

FIG. 7 illustrates an example of a method for inputting characters in a portable device according to the embodiment of the present invention. In FIG. 7, the changes in a selecting character window and a selected character window can be described according to character inputting steps. Left half portions of colons illustrate the selecting character windows, and right half portions of the colons illustrate the selected character window in the steps of 510, 520, 530, 540, and 550.

The composition of the characters can be the same as the virtual coordinate table 310 and character table 320 shown in FIG. 3.

A default character line, for example, A, B, C, D, E, and F, can be displayed on a selecting character window in the step 510. A cursor is located on the character A, therefore, the X- and Y-coordinates of the virtual coordinates indicated by the cursor are 0 and 5. A selected character does not exist in the selected character window in the step 510. By one input of a DOWN key in the step 610, the Y-coordinate can be changed from 5 to 4, while the X-coordinate remains equal to 0. According to the decrease in the Y-coordinate by one, a character line G, H, I, J, K, and L corresponding to the virtual coordinate $Y_4$ is displayed on the selecting character window, in the step 520. The cursor is located on the character G. By one input of an ENTER key in the step 610, the character G can be displayed on the selected character window in the step 520.

By the input of an UP key twice in the step 620, the Y-coordinate increases by two units. Thus, the Y-coordinate can be changed from 4 to 5 according to the first input of the UP key, and from 5 to 0 according to the second input of the UP key. The Y-coordinates vary from 0 to 5, thereby changing the Y-coordinate from 5 to 0. Therefore, the character line 4, 5, 6, 7, 8, and 9 corresponding to the virtual coordinate $Y_0$ is displayed on the selecting character window, in the step 530. By the input of a RIGHT key for three times in the step 620, the X-coordinate increases by three units. Thus, the X-coordinate is changed from 0 to 3, thereby moving the cursor toward right for three characters. As a result, the cursor is located on the character 7. By one input of the ENTER key in the step 620, the character 7 can be displayed next to the character G on the selected character window in the step 530.

The UP key is input twice in the step 630, thereby increasing the Y-coordinate by two units. Thus, the Y-coordinate can be changed from 0 to 2 for displaying the character line S, T, U, V, W, and X corresponding to $Y_2$ on the selecting character window, in the step 540. The X-coordinate is not changed, thereby locating the cursor on the character V.

By inputting a LEFT key twice, the X-coordinate can be decreased by two units. The X-coordinate can be decreased from 3 to 1, and the cursor is moved toward left for two characters. Accordingly, the cursor is located on the character T as shown on the selecting character window, in the step 550. By one input of the ENTER key, the character T can be selected and displayed on the selected character window, in the step 550.

As described above, a user can change virtual coordinates, which are indicated by a cursor in a selecting character window, by using UP, DOWN, RIGHT, and LEFT keys for displaying the characters corresponding to the changed coordinates by the predetermined unit, i.e., the character line. Therefore, the characters can be input quickly and easily by using a small number of input keys. Moreover, when the user already knows the arrangement of the characters from the manual of a portable device, the user can input the characters more easily.

It is noted that the present invention is not limited to the preferred embodiments described above, and it is apparent that variations and modifications by those skilled in the art can be effected within the spirit and scope of the present invention defined in the appended claims and equivalents thereof.

According to the present invention, the characters are input quickly and easily in the portable device having limited display size and number of input keys.

Additionally, if the characters embedded in the portable device are changed or more characters are added, the characters are additionally arranged in a virtual space having virtual coordinates or the characters are arranged in new virtual coordinates via a software method. Then, the software can be downloaded to the portable device, thereby expanding the function of the portable device without changes in the hardware of the portable device.

What is claimed is:

1. A method for navigating and inputting characters in a portable device, comprising a display unit including a predetermined selecting character window and a selected character window, a memory for storing at least one character having intrinsic virtual coordinates, and a plurality of input keys, the method comprising the steps of:

selecting the selecting character window;

navigating the at least one character by changing virtual coordinates indicated by a cursor by using at least two input keys;

displaying a character line including the at least one character corresponding to the virtual coordinates indicated by the cursor, on the selecting character window;

selecting a selected character from the at least one character on the selecting character window by using an input key among a plurality of input keys; and displaying the selected character on the selected character window, wherein the virtual coordinates include X- and Y-coordinates, the at least one character is arranged on X- and Y-axes for corresponding to the virtual coordinates, and the at least one character is arranged on the X-axis for being included in the character line, wherein the input keys include a LEFT key, a RIGHT key, an UP key, a DOWN key, and an ENTER key, and wherein navigating the at least one character comprises at least one of increasing the Y-coordinate of the virtual coordinates indicated by the cursor in the selecting character window by an input of the UP key, decreasing the Y-coordinate of the virtual coordinates indicated by the cursor in the selecting character window by an input of the DOWN key, decreasing the X-coordinate of the virtual coordinates indicated by the cursor in the selecting character window by an input of the LEFT key, and increasing the X-coordinate of the virtual coordinates indicated by the cursor in the selecting character window by an input of the RIGHT key.

2. A portable device comprising:

a display unit including a character window for displaying characters, wherein the character window includes a selecting character window for displaying a character line including at least one character, each character corresponding to virtual coordinates indicated by a cursor, and a selected character window for displaying a selected character, selected from the at least one character, on the selecting character window;

a memory for storing the at least one character, each character having intrinsic virtual coordinates, wherein the virtual coordinates include X- and Y-coordinates, the at least one character is arranged on the X- and Y-axes corresponding to the virtual coordinates of the at least one character, and the at least one character included in the character line is arranged on the X-axis;

a plurality of input keys for navigating the at least one character and selecting the selected character by using the virtual coordinates of the selected character, wherein the input keys include a LEFT key, a RIGHT key, an UP key, a DOWN key, and an ENTER key; and a microprocessor for controlling a display of the selected character on the display unit according to an input of the input keys, wherein, the selected character is selected according to a Y-coordinate indicated by the cursor on the virtual coordinates in the selecting character window is increased by the input of the UP key and decreased by the input of the DOWN key, and an X-coordinate indicated by the cursor on the virtual coordinates in the selecting character window is decreased by the input of the LEFT key and increased by the input of the RIGHT key.

3. A portable device comprising:

a display unit including a character window for displaying characters, wherein the character window includes a selecting character window for displaying a character line including at least one character, each character corresponding to virtual coordinates indicated by a cursor, and a selected character window for displaying a selected character, selected from the at least one character, on the selecting character window;

a memory for storing the at least one character, each character having intrinsic virtual coordinates;

a plurality of input keys for navigating the at least one character and selecting the selected character by using the virtual coordinates of the selected character; and a microprocessor for controlling a display of the selected character on the display unit according to an input of the input keys.

4. The portable device of claim 3, wherein the virtual coordinates includes X- and Y-coordinates;

the at least one character is arranged on the X- and Y-axes corresponding to the virtual coordinates of the at least one character; and the at least one character included in the character line is arranged on the X-axis.

5. The portable device of claim 4, wherein the input keys include a LEFT key, a RIGHT key, an UP key, a DOWN key, and an ENTER key.

6. The portable device of claim 5, wherein, the selected character is selected according to a Y-coordinate indicated by the cursor on the virtual coordinates in the selecting character window is increased by the input of the UP key and decreased by the input of the DOWN key; and an X-coordinate indicated by the cursor on the virtual coordinates in the selecting character window is decreased by the input of the LEFT key and increased by the input of the RIGHT key.

7. The portable device of claim 6, wherein the selected character indicated by the cursor in the selecting character window is selected by the input of the ENTER key for being displayed on the selected character window.

8. The portable device of claim 7, wherein the virtual coordinates further includes a Z-coordinate;

the at least one character having a same Z-coordinate forms one page; and the Z-coordinate in the virtual coordinate, which is indicated by the cursor in the selecting character window, is changed by the input of at least one input key.

9. The portable device of claim 5, wherein the character line includes a predetermined number of characters having an identified Y-coordinate.

10. The portable device of claim 9, wherein the predetermined number of the characters included in the character line is the same as the number of characters displayed on the selecting character window.

11. The portable device of claim 3, wherein a title of a file including the selected character is displayed in a predetermined region of the character window, wherein the title displayed comprises one or more characters in addition to the selected character.

12. The portable device of claim 3, wherein the portable device is one of an MPEG audio layer 3 (MP3) player for reproducing MP3 files, a compact disk player (CD player) for reproducing the files stored in a CD, and a combination device having the functions of both MP3 player and CD player.

13. A method for navigating and inputting characters in a portable device, comprising a display unit including a predetermined selecting character window and a selected character window, a memory for storing at least one character having intrinsic virtual coordinates, and a plurality of input keys, the method comprising the steps of:

selecting the selecting character window;

navigating the at least one character by changing virtual coordinates indicated by a cursor by using at least two input keys;

displaying a character line including the at least one character corresponding to the virtual coordinates indicated by the cursor, on the selecting character window;

selecting a selected character from the at least one character on the selecting character window by using an input key among a plurality of input keys; and displaying the selected character on the selected character window.

14. The method of claim 13, wherein the virtual coordinates include X- and Y-coordinates;

the at least one character is arranged on X- and Y-axes for corresponding to the virtual coordinates; and the at least one character is arranged on the X-axis for being included in the character line.

15. The method of claim 14, wherein the input keys include a LEFT key, a RIGHT key, an UP key, a DOWN key, and an ENTER key.

16. The method of claim 15, wherein navigating the at least one character comprises at least one of:

increasing the Y-coordinate of the virtual coordinates indicated by the cursor in the selecting character window by an input of the UP key;

decreasing the Y-coordinate of the virtual coordinates indicated by the cursor in the selecting character window by an input of the DOWN key;

decreasing the X-coordinate of the virtual coordinates indicated by the cursor in the selecting character window by an input of the LEFT key; and increasing the X-coordinate of the virtual coordinates indicated by the cursor in the selecting character window by an input of the RIGHT key.

17. The method of claim 16, wherein selecting the selected character is performed by selecting the ENTER key.

18. The method of claim 15, wherein the character line includes a predetermined number of characters having an identified Y-coordinate.

19. The method of claim 18, wherein the predetermined number of the characters included in the character line is the same as the number of characters displayed on the selecting character window.

20. The method of claim 13, wherein the method further comprises displaying a title of a file including the selected character, in a predetermined region of the display unit, wherein the title displayed comprises one or more characters in addition to the selected character.

21. The method of claim 13, wherein the portable device is one of an MP3 player for reproducing MP3 files, a CD player for reproducing files recorded on a compact disk, and a combination device having the functions of both MP3 player and CD player.

22. The portable device of claim 3, wherein the virtual coordinates include X- and Y-coordinates defining a page of characters, and a Z-coordinate indicating a page of characters from among a plurality of pages of characters, the at least one character is arranged on X-, Y- and Z-axes corresponding to the virtual coordinates of the at least one character.

* * * * *